United States Patent

[11] 3,545,367

[72] Inventors Bonner L. Smith
North Augusta;
Joe D. Smith, Orangeburg, South Carolina
[21] Appl. No. 820,858
[22] Filed May 1, 1969
[45] Patented Dec. 8, 1970
[73] Assignee Still-Walter Tool & Manufacturing Company
Orangeburg, South Carolina
a corporation of South Carolina

[54] CLEAT STACKING APPARATUS
16 Claims, 16 Drawing Figs.
[52] U.S. Cl. .................................................. 100/7;
214/6
[51] Int. Cl. .................................................. B65g 57/30
[50] Field of Search .......................................... 214/6.2,
6.5, 6(P); 100/7

[56] References Cited
UNITED STATES PATENTS
3,305,104  2/1967  Hogan et al. .................... 214/6(.2)

*Primary Examiner*—Gerald M. Forlenza
*Assistant Examiner*—Robert J. Spar
*Attorney*—B. P. Fishburne, Jr.

ABSTRACT: A continuously moving endless belt bed conveys cleats from a sawing machine to a stacking station where individual layers of cleats are elevated to produce a multiple layer stack containing the desired total number of cleats. The resulting stack is shifted by an ejecting means to a tying station where the stack is tightly bound with a tying element for subsequent handling or shipment. The apparatus includes means for counting the number of cleats in a single layer and for truing or straightening the procession of cleats periodically on the conveyor belt bed and also means for assuring complete entry of each layer into the stacking hopper regardless of splintering or other irregularities in the cleats. The various apparatus components are timed in their operation by simplified electrical controls.

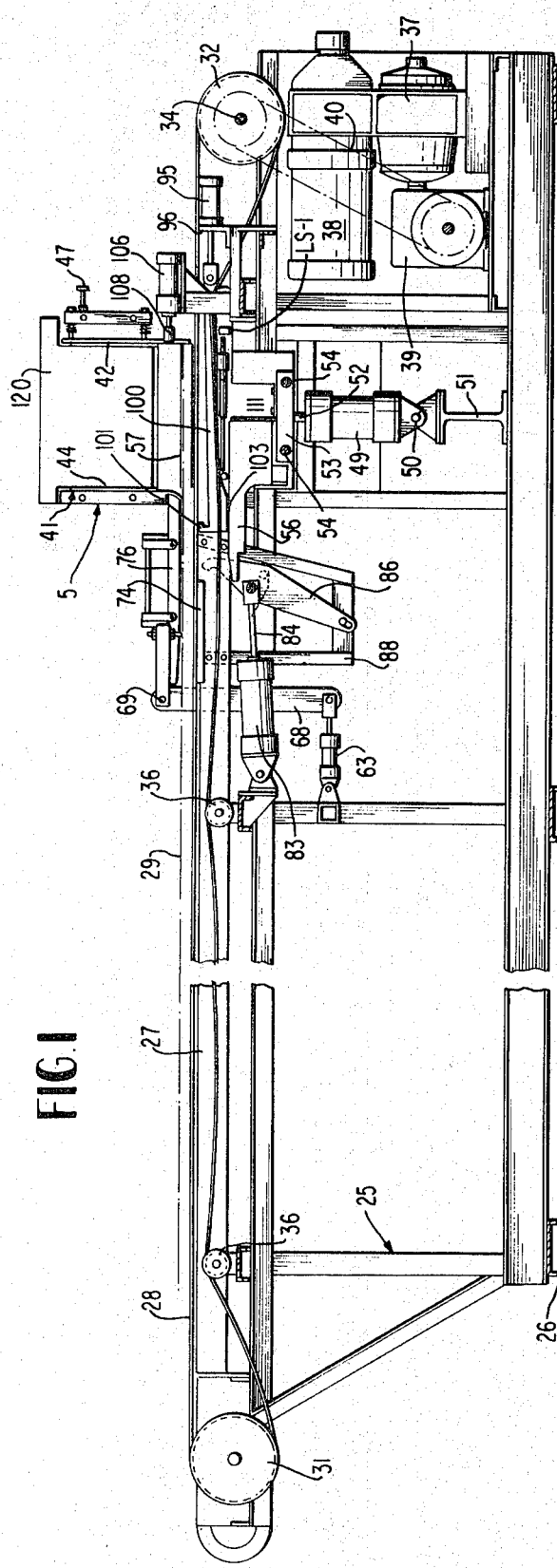

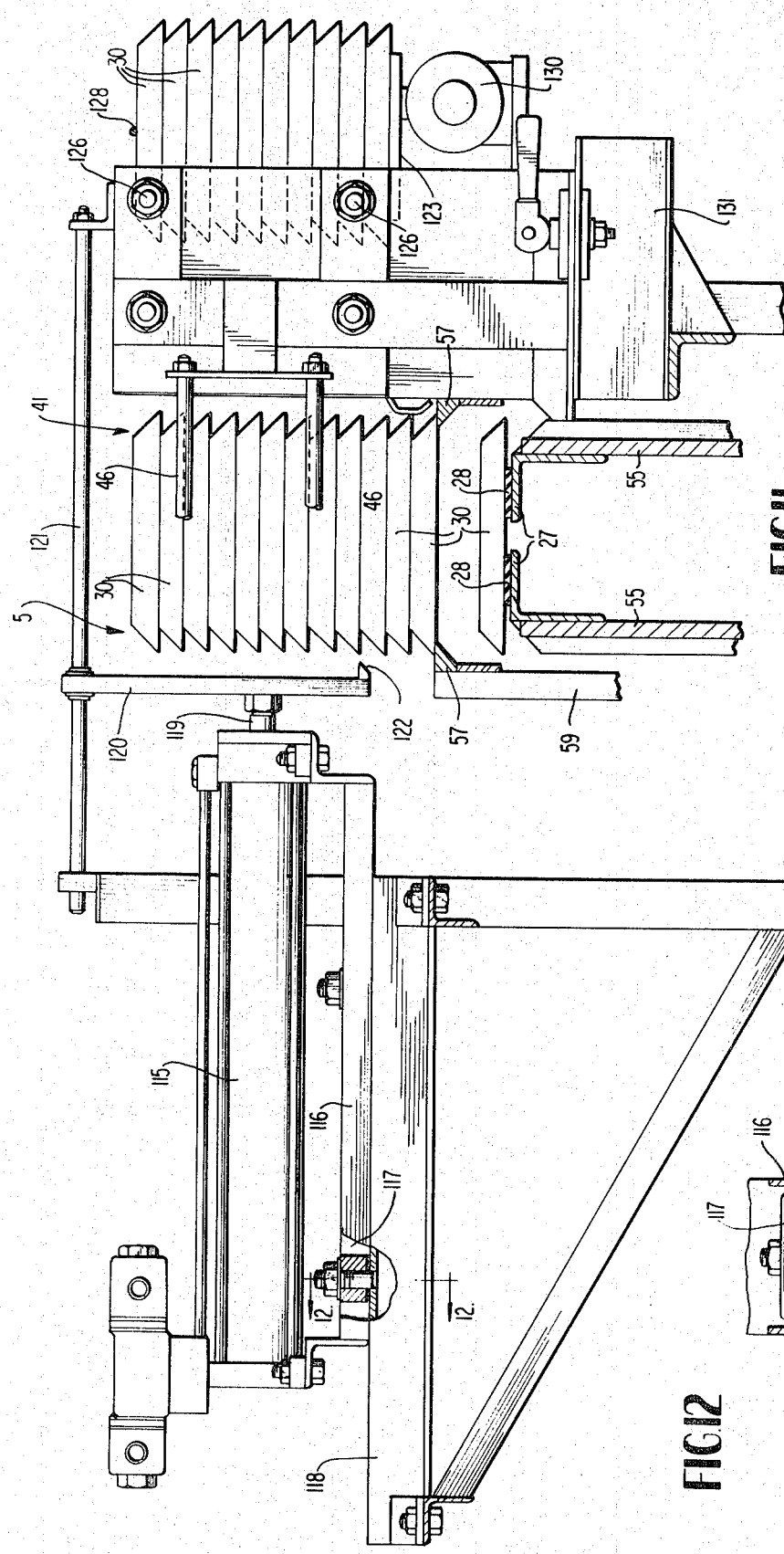

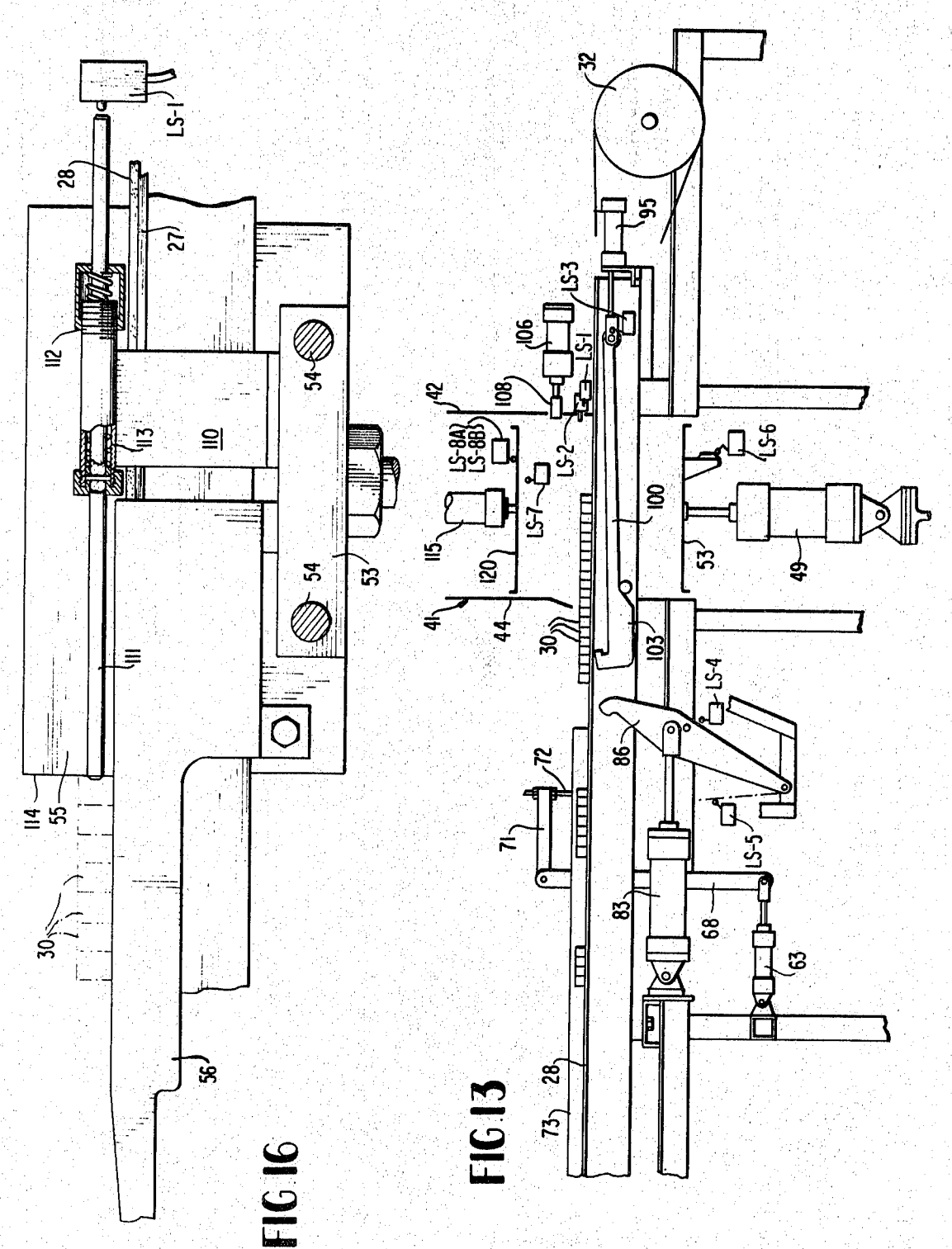

3,545,367

CLEAT STACKING APPARATUS

BACKGROUND OF THE INVENTION

The well known wire bound boxes employed for the shipment of frozen poultry and certain fresh produce have been in wide usage for many years and this form of receptacle possesses many advantages over competitive types, such as corrugated board receptacles, plastic receptacles and the like. However, competitive difficulties have arisen in connection with the manufacturing of wire bound boxes due to a number of factors and one of the main difficulties resides in the handling, stacking and binding of the large numbers of wooden cleats which must be employed in the making of these boxes. Traditionally, these cleats have been gathered into stacks and packaged largely by hand, requiring much labor and consuming much time and therefore rendering the resultant product less competitive.

At least one prior art machine has been devised to overcome this problem and such machine is disclosed in U.S. Pat. No. 3,305,104, issued Feb. 21, 1967, to W. J. Hogan et al. While the objectives of the present invention are basically the same as those specified in the Hogan et al. patent, the present invention apparatus is considerably simplified and less intricate and therefore more practical and reliable in operation. Additionally, the present apparatus possesses components which deal with certain inherent problems not completely dealt with by the machine of the Hogan et al. patent. One such problem resides in the splintering or splitting or warping which are inherently found in some of the cleats so as to render more difficult the gathering together of cleats in even layers at the stacking station. Another problem which the invention deals with in a more efficient and economical manner is the straightening or truing of the cleats as they move forwardly with the conveyor belts. A fundamental difference between the invention apparatus and the machine of the Hogan et al. patent resides in the provision in the invention apparatus of continually moving belts forming a conveyor bed for the cleats as distinguished from a rigid support over which cleats are pushed in the Hogan et al. machine. It is believed that this difference is rather fundamental in the provision of a more simplified and reliable machine for this purpose and one having an improved mode of operation. Other features and advantages of the invention will become apparent during the course of the following description.

BRIEF DESCRIPTION OF DRAWING FIGURES

FIG. 1 is a fragmentary side elevation of a cleat stacking apparatus embodying the invention.

FIG. 2 is a fragmentary plan view thereof.

FIG. 11 is an enlarged fragmentary vertical section, partly in elevation, taken on line 11–11 of FIG. 2.

FIG. 12 is an enlarged fragmentary vertical section taken on line 12–12 of FIG. 11.

FIG. 13 is a diagrammatic side elevational view of the apparatus showing the location of the various power cylinders and electrical limit switches.

FIG. 16 is a fragmentary side elevation, partly in section, of a limit switch and actuator means.

DETAILED DESCRIPTION OF PREFERRED EMBODIMENT

Figure 3:
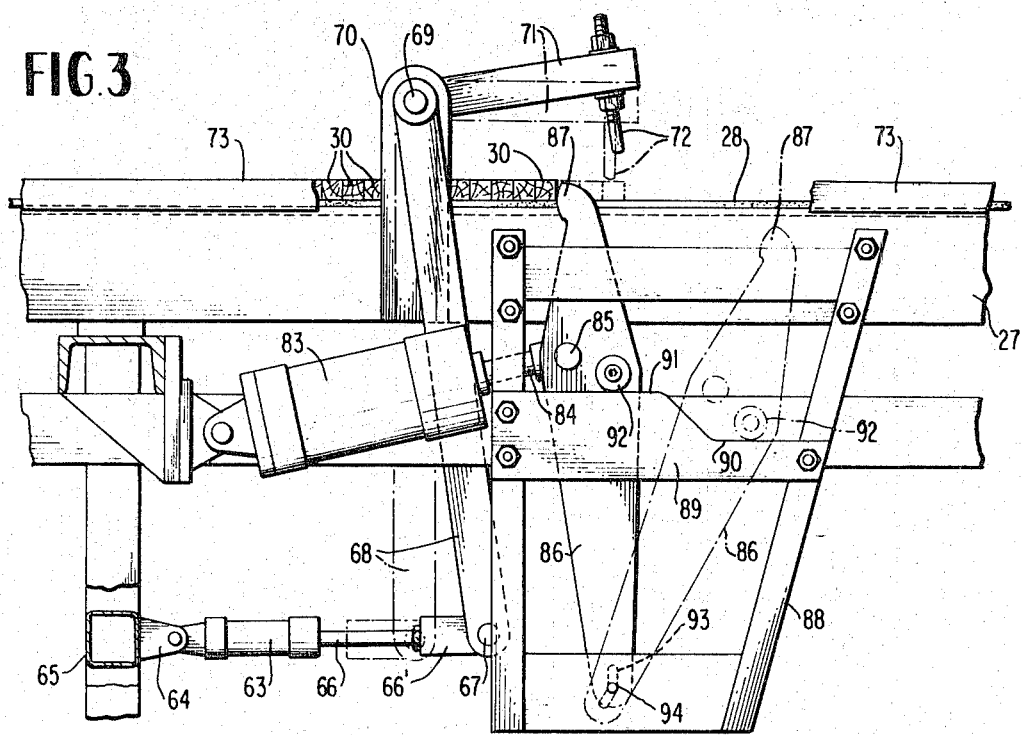
FIG. 3 is an enlarged fragmentary side elevational view of cleat counting and straightening components.

While the apparatus is disclosed for handling and stacking cleats of the character employed to make wire bound boxes, it should be understood that the identical apparatus by increased width adjustment is equally capable of being used for handling and stacking various elongated objects including lumber. The present machine has a range of lateral adjustments enabling it to accommodate cleats from 7 inches to 16 inches in length which encompasses the sizes commonly needed in the making of wire bound boxes. The range of adjustment can easily be increased to accommodate much longer pieces.

Referring to the drawings in detail wherein like numerals designate like parts throughout, the machine has a main framework 25 which may be bodily adjusted laterally on floor-engaging base members 26 through any conventional means. At its top, the main framework includes level longitudinal bed members 27 which support slidably the top runs 28 of a pair of laterally spaced parallel continuously moving conveyor belts upon which the cleats are delivered from a sawing machine, not shown, to the ultimate stacking station, to be described. It is to be emphasized that except for certain interruptions the cleats move continuously with the top belt runs 28 and rest thereon and extend transversely thereof in a common level plane indicated by the line 29 in FIG. 1, the individual cleats being designated by the numeral 30 in the various drawing FIGS.

The conveyor belts engage pairs of laterally adjustable pulleys 31 and 32 at the upstream and downstream ends of the apparatus mounted on transverse horizontal shafts 33 and 34 having suitable bearings. The upstream shaft 33 is connected with suitable belt slack takeup means 35 of any preferred type through which the shaft 33 may be shifted longitudinally of the machine, as required. Suitable underlying guide sheaves 36 for the lower runs of the endless belts are provided, as shown. A main motor 37 and variable speed drive 38 are coupled through a speed reducer 39 with gearing 40 connected with the pulley shaft 34 to rotate the same at the proper speed and direction to advance the cleats continuously.

Figure 9:
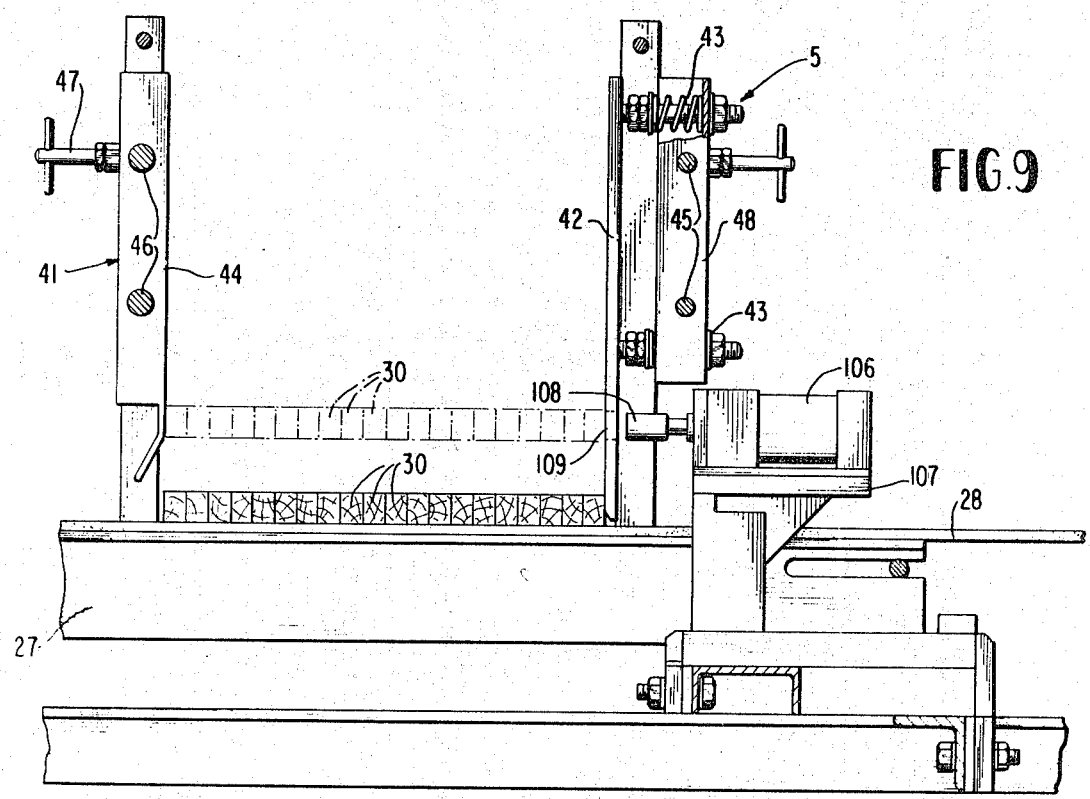
FIG. 9 is an enlarged fragmentary side elevational view, partly in section, of the apparatus stacking hopper.

Near the downstream end of the apparatus, the cleat stacking station S, FIGS. 1 and 2, is located including a stacking chamber or hopper 41, FIG. 9, having a vertical downstream wall member or plate 42 backed up by spring means 43, as shown. In opposition to the plate means 42 somewhat upstream and parallel thereto is a vertical plate structure 44 forming the other wall of the stacking hopper. The hopper wall forming elements 42 and 44 are preferably segmental and are adjustable transversely of the apparatus and belts 28 on transverse bars 45 and 46, and are locked in place at selected adjusted positions by setscrews 47. The spring means 43 and bars 45 are mounted on and supported by fixed uprights 48, as shown.

Figure 8:
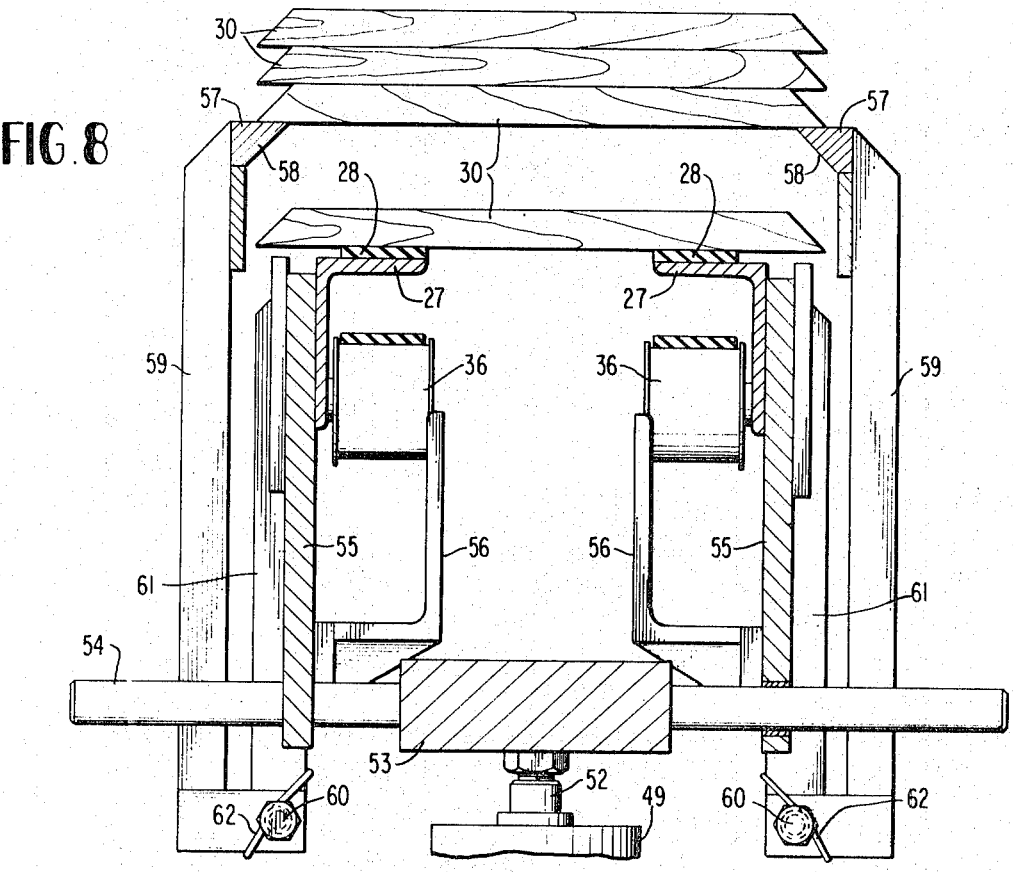
FIG. 8 is a transverse vertical section through the apparatus at the stacking station.

Directly beneath the stacking chamber or hopper 41 is a pneumatically operated vertical stacking cylinder 49 secured at 50, FIG. 1, to an underlying member 51 of the main framework. Referring to FIGS. 1 and 8, the extensible and retractable piston rod 52 of cylinder 49 is secured to the crosshead 53 carrying transverse horizontal rods 54 upon which are mounted, laterally adjustably, parallel vertical cleat lifting plates 55 whose top edges may rise and engage a single layer of cleats 30 in the stacking hopper 41 and elevate them.

Figure 4:
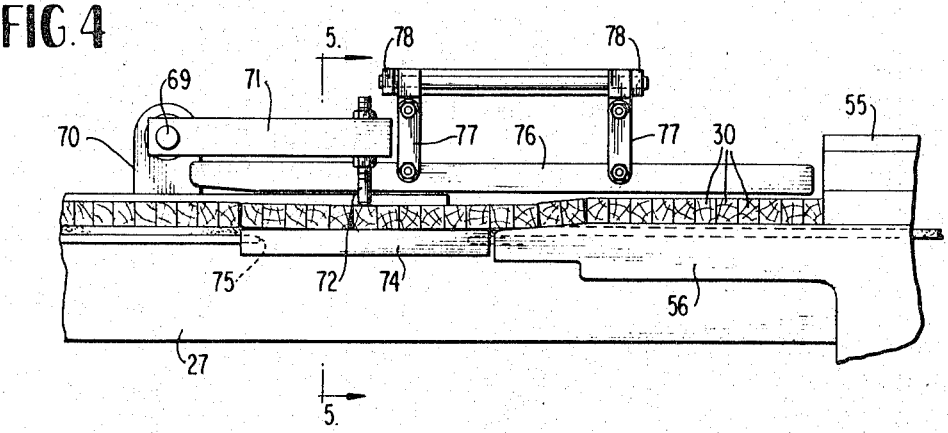
FIG. 4 is a similar elevational view of a staybar device and associated elements.

Rigid with the lifting plates 55 and movable therewith upwardly and downwardly and spaced laterally inwardly thereof are rail extensions 56, FIGS. 4 and 8, which project upstream from the hopper 41 for some distance as can be seen in FIG. 1. The function or purpose of these rail extensions 56 will be fully described. Operating in conjunction with the vertically shiftable cleat lifting plates 55 which elevate layers of cleats from the upper belt runs 28 are latch bars 57 having lower beveled faces 58 adapted to be engaged and cammed outwardly by the beveled ends of the cleats as the latter are elevated. These latch bars 57 extend longitudinally of the belts 28, FIG. 1, within the stacking hopper 41 and are carried by vertically swingable arms 59 having their lower ends pivoted at 60 to fixed upright guide members 61 on the machine framework. The arms 59 and latch bars 57 are biased inwardly toward the transverse center of the apparatus by suitable spring means which may be in the form of torsion springs 62, FIG. 8, surrounding the pivot elements 60. If preferred, some form of retractile spring may interconnect the arms 59 at a convenient point or a compression spring may be arranged to bear upon the outside of each arm. In any event, the arms 59 will yield outwardly when a layer of cleats 30 is raised by the plates 55 and the beveled ends of the cleats engage the faces 58 and cam the latch bars 57 outwardly. As soon as the layer of cleats passes above the latch bars, they will instantly return to their normal positions and support this layer of cleats and all previously elevated layers thereabove in the stack being created, FIG. 8. It may be mentioned here that it is ordinarily desired to produce a stack or package containing 200 cleats composed of 10 distinct horizontal layers with 20 cleats in each layer. However, the machine is not restricted to any precise number of cleats per layer or any precise number of layers per stack or per package.

Figure 5:
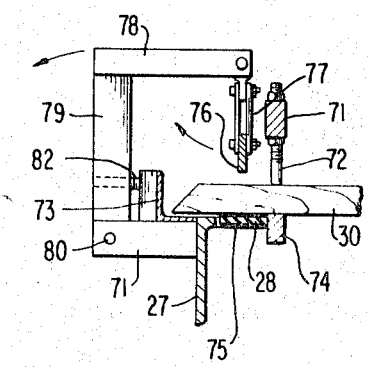
FIG. 5 is a fragmentary vertical section taken on line 5–5 of FIG. 4.

Upstream from the stacking station S are several very important components of the apparatus which are essential to its proper operation. One of these components is a cleat movement interrupting and counting mechanism shown in FIGS. 3—5, which assures that a precise number of cleats, such as 20, will be consistently included in each layer entering the hopper 41 with the belts. The counting mechanism comprises a pneumatic power cylinder 63 secured at 64 to a main frame member 65 at the transverse center of the apparatus. The piston rod 66 of this cylinder is secured through a clevis 66' to a cross-shaft 67 below the machine bed and having pivoted thereto in laterally spaced relation long crank arms 68, which are vertically swingable. The tops of these crank arms are secured firmly to rocker shafts 69 journaled in suitable bearing posts 70 on the main frame. Substantially right angular levers 71 are secured to the interior ends of the rocker shafts 69 and bearings, FIG. 2, and project toward the downstream end of the apparatus and carry adjustable cleat clamping pins 72 near their downstream ends. The procession of cleats 30 moving into the apparatus from the sawing machine upon the belt runs 28 are guided by parallel angle rails 73 whose upturned flanges are close to the ends of the cleats as depicted in FIG. 5. These rails 73, as shown in FIG. 2, extend continuously from the upstream end of the apparatus to points beyond or downstream from the clamping plungers 72 of the counting mechanism. It should also be understood that the operation of the pneumatic cylinder 63 through the cranks 68 and associated parts causes raising and lowering of the two clamping plungers 72 in unison.

As best shown in FIG. 5, the clamping pins or plungers 72 and levers 71 are arranged immediately inwardly of belts 28 and slightly below the tops of the belts, such as one-eighth inch or one-quarter inch therebelow, are rigid stationary horizontal clamping bars 74 whose downstream ends terminate substantially at the upstream ends of rail extensions 56, FIG. 5. The horizontal flanges of the rigid bed members 27 are cut away as shown at 75 so that the plungers 72, when moved downwardly against a cleat, can force the belt 28 at this locality below the upper surface of the bed member 27 and into the opening 75, thus allowing the particular cleat to be clamped against the bars 74 so that its downstream movement is arrested while the conveyor belt 28 simply continues to slide beneath the cleat.

Adjacent to and slightly laterally outwardly of the levers 71 and clamping plungers 72, are floating horizontal staybars 76 whose lower edges are spaced slightly above the cleats 30 as depicted in FIG. 4. The staybars will prevent any tendency of the backlogging cleats to buckle or hump upwardly if this tendency should occur. Each staybar 76 is suspended through swingable links 77 from overhead transverse arms 78, rigidly mounted on vertical legs 79 whose lower ends are pivoted at 80, FIG. 5, to support lugs 81 welded to the outer sides of bed members 27. By this means, the two staybar assemblies may, if desired, be swung laterally outwardly as indicated by the arrow in FIG. 5. Adjustable screw stops 82 on the legs 79 are provided to accurately adjust the positions of the staybars 76 above the cleats. As shown in FIG. 4, the staybars extend from points somewhat upstream of the clamping or counting plungers 72 to downstream terminal points near the inlet side of stacking hopper 41 and near the cleat lifting plates 55. At this point, the staybars are above the rail extensions 56 although slightly laterally outwardly thereof.

Another important feature or component of the apparatus contributing greatly to its efficiency of operation and shown in FIG. 3 is a cleat straightening or truing mechanism which periodically engages the procession of moving cleats and pushes them rearwardly and arranges them transversely of the belts 28, as occasionally the cleats will tend to become somewhat diagonally disposed on the two belts. This mechanism comprises a pneumatic power cylinder 83 at the transverse center of the machine somewhat above the cylinder 63 and having its extensible and retractable piston rod 84 secured to a cross shaft 85. This cross shaft has its ends connected with shiftable cleat straightening arms 86 disposed in vertical planes just outwardly of the edges of belts 28. The arms 86 have cleat striker heads 87 on their upper ends adapted to rise above the belts and contact the cleats 30 near their opposite ends at predetermined intervals during the machine operation.

Depending vertical frames 88 are suitably secured to the bed members 27 and carry cam plates 89 near the centers of the arms 86 having stepped cam edges 90 and 91 engageable with follower rollers 92 on the two cleat straightening arms. The lower ends of the arms 86 are slotted at 93 and these slots receive fixed guide pins 94 on the frames 88. When the power cylinder 83 is retracted, FIG. 3, the two straightening arms 86 are swung upstream with respect to cleat movement and the rollers 92 ride up onto the cam steps 91 and cause the striker heads 87 to rise above the belts while simultaneously moving rearwardly or upstream. The two striker heads on opposite sides of the machine move in unison being activated by the common cross-shaft 85 and the ends of the cleats are engaged simultaneously and caused to assume correct right angular positions on the belts while the belts continuously travel. When the piston rod 84 is extended, the arms 86 and striker heads 87 will move downstream and the heads will dip below the belts 28 and below the cleats as the follower roller 92 moves onto the lower cam step 90.

Figure 6:
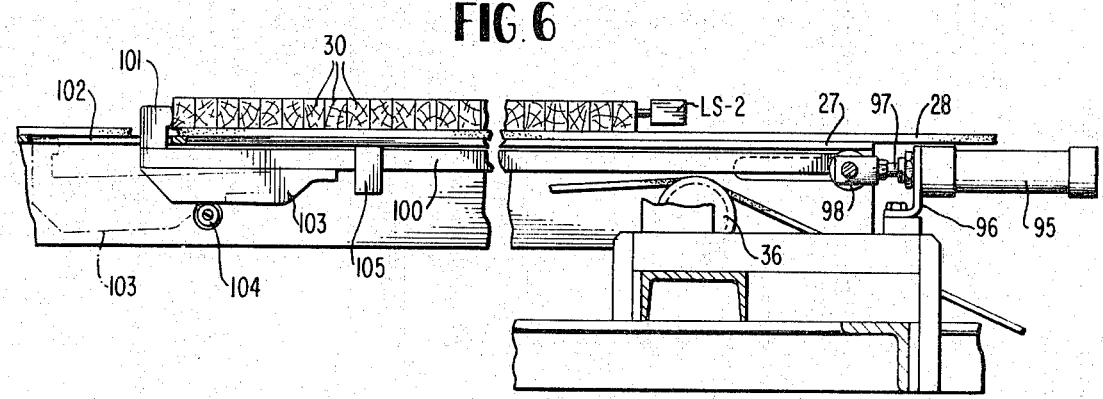
FIG. 6 is a fragmentary vertical section taken on line 6–6 of FIG. 7.
Figure 7:
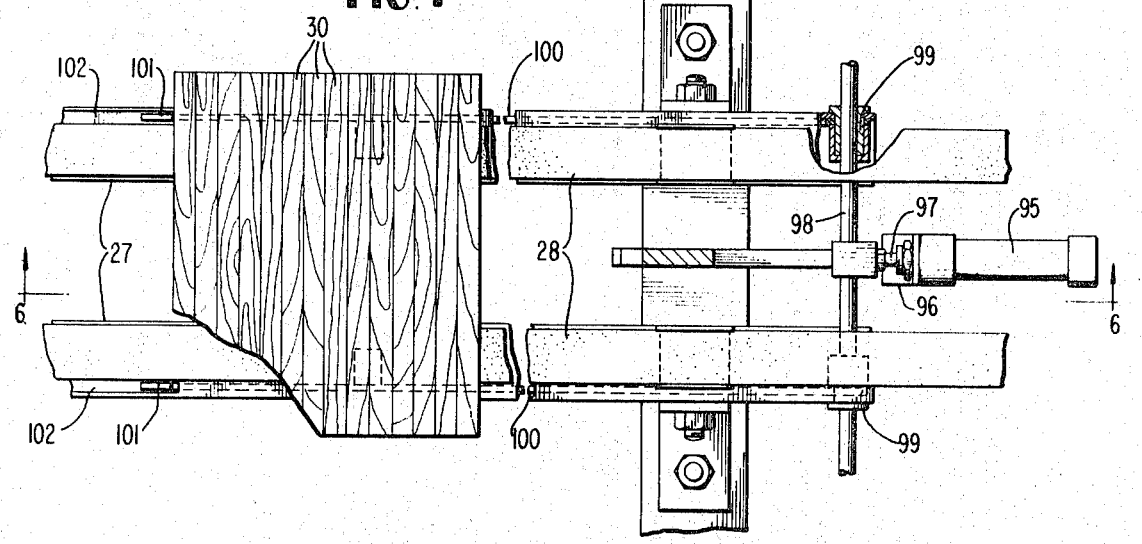
FIG. 7 is a fragmentary plan view, partly in section, of the components in FIG. 6.

A further important component of the apparatus shown primarily in FIGS. 6 and 7 resides in a mechanism which assures the final and complete entry of each layer of 20 cleats into the stacking hopper 41 without any misalignment of cleats or gaps between them. Regarding this, inevitably some cleats are splintered or slightly split with irregularities and some warping. Without some means to firmly pack each layer at the stacking zone to assure contacting relation of the 20 cleats, difficulties can develop when the layer is elevated by means of the stacking cylinder 49 and associated parts, already described. The cleat pushing or packing mechanism in question comprises another power cylinder unit 95 suitably mounted upon a bracket 96 near the downstream end of the apparatus and at the center thereof, FIG. 7 and FIG. 2. The piston rod 97 of this unit is connected to a cross-shaft 98, in turn connected through bearings 99 with longitudinal cleat pushing bars 100 which lie immediately outwardly of the belts 28 as clearly shown in FIG. 7. At their upstream ends, the pusher bars 100 have upstanding cleat pusher heads 101 adapted to rise through clearance slots 102 in the adjacent bed members or rails 27. This rising action is produced at predetermined times by the coaction of lifting cams 103 on the bottoms of bars 100 and fixed cam rollers 104 on the members 27. When the cams 103 ride up on the rollers 104 as the bars 100 are moving toward the stacking station due to retraction of the piston rod 97, the heads 101 will rise behind the layer of cleats 30 and engage the last cleat in this layer and firmly push the layer of 20 cleats into the hopper 41 and against the downstream wall 42.

When the piston rod 97 is extended, the cams 103 will pass off of the rollers 104 and assume the positions shown in broken lines in FIG. 6 and the pusher heads 101 will be lowered through the slots 102 to elevations below the belts and cleats. Additional fixed guides 105 for the bars 100 may be provided on the members 27 as indicated.

Referring to FIG. 9, a pneumatic clamping cylinder 106 is fixedly mounted on a bracket means 107 at the downstream end of the stacking station and at the transverse center thereof and includes a cleat stack clamping plunger or head 108 on the piston rod thereof at an elevation above the belts 28. The clamping head 108 may be extended into the rear side of the stacking hopper or chamber through an opening 109 in the wall means 42. The operation of the clamping means will be further described in the overall summary of operation of the machine.

On the stacking cylinder crosshead 53 and rising and falling therewith is a support bracket means 110 carrying a horizontal longitudinal limit switch actuating reciprocating rod 111 having guide means 112, as indicated, and preferably although not necessarily being spring-loaded in the upstream direction by a compression spring 113. As can be observed in FIG. 16, when the stacking cylinder crosshead 53 is fully raised, the rod 111 will be at the proper elevation to be engaged by the leading cleat 30 which has ridden up onto the rail extensions 56 approximately one-eighth of an inch above the continuously moving belts 28. The pressure of additional cleats upstream moving with the belts 28 will push further cleats up onto the rail extensions 56 and gradually enough pressure will build up to push the leading cleat against the rod 111 and the latter will shift axially and engage a limit switch LS-1 near the rear of the stacking chamber, FIGS. 16 and 13. This limit switch is also suitably connected with the crosshead means 53 so as to rise and fall therewith and with the rod 111. The upstream end of the actuator rod 111, FIG. 16, is normally disposed substantially at the upstream side of the stacking hopper 41 which corresponds to the upstream vertical edge 114 of lifting plates 55, FIGS. 2 and 16. In some cases, the normal spring tension in the switch LS-1 will be sufficient to eliminate the need for spring 113, in which case this spring may be omitted.

Figure 10:
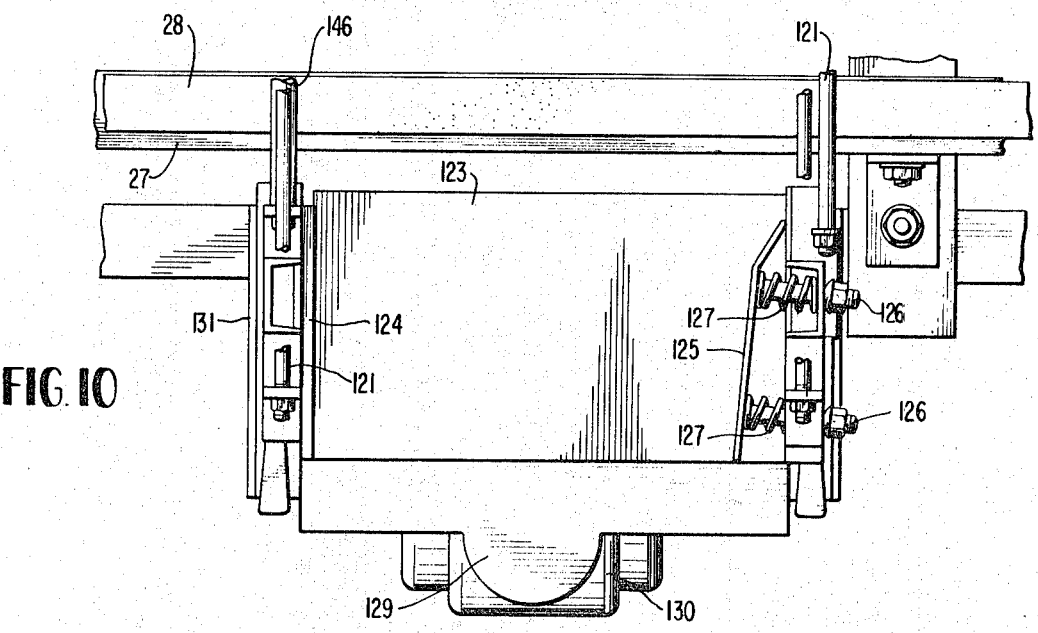
FIG. 10 is a fragmentary plan view of a stack ejection box or support and associated tying means.

Continuing to refer to the drawings, FIGS. 10 and 11 show means for ejecting stacked cleats from the apparatus for tying or binding with wire so as to make a unitized package. As shown in FIGS. 2 and 11, the ejecting means operates at right angles to the main bed members 27 and belts 28 at an elevation well above the same. The stack ejecting means comprises a transverse horizontal pneumatic power cylinder 115 having a base bracket 116 secured by a clamping plate 117 to a transverse extension 118 of the apparatus main frame. The piston rod 119 of cylinder unit 115 carries an ejector or pusher plate 120 guided in its movement by overhead rails 121 on the apparatus frame structure. The ejector plate has a stroke long enough to shift a stack of the cleats 30, such as a 10-layer stack, from an initial position in the center of the hopper 41 to an ejected position beyond one side of the stacking hopper, as indicated at the right-hand side of FIG. 11. The lower edge of the ejector plate 120 has a beveled lip 122 which engages the tapered ends of cleats in the lowermost layer of the stack being ejected and cleanly separates the stack of 10 layers from the remaining underlying layers at the stacking station. The invention is not restricted to 10 layers of cleats per stack and 20 cleats per layer and these numbers may be varied. However, a cleat stack or package containing 200 cleats is customary.

The stack of cleats ejected by the plate 120 is pushed laterally into a stack receiver, FIG. 10, having a bottom wall 123, one fixed sidewall 124 and a spring-urged sidewall 125, including bolt elements 126 surrounded by springs 127. This assures one side of the stack being squared off against the vertical wall 124 of the receiver. With the ejected stack so held, a tying wire 128, FIG. 11, is laid over the top of the stacks centrally where they project beyond the outlet end of the receiver and this wire is passed downwardly at the opposite sides of the stack and then directed beneath the stack and under a projecting lip 129 or extension of the receiver bed where a conventional automatic tying apparatus 130 suitably supported on the apparatus framework completes the tying of the wire tightly around the stack or package. The details of this tying apparatus need not be described since the apparatus is a commercial component or conventional. The entire stack receiver and wire tying structure is securely mounted on a lateral extension 131 of the machine framework.

Referring to FIG. 13, which is partly schematic of the apparatus, the several pneumatic power cylinders previously described are shown, together with the critical elements of the apparatus which they operate. In association with these power cylinders and the elements which they operate are a number of electrical limit switches in addition to the previously-described switch LS-1. These additional switches are designated LS-2, LS-3, LS-4, LS-5, LS-6, LS-7, LS-8a and LS-8b in FIG. 13 and it may also be noted that the switch LS-2 located at the downstream end of stacking hopper 41 is also shown in FIG. 6. These various switches may be mounted in any conventional way at the indicated locations.

Figure 14:
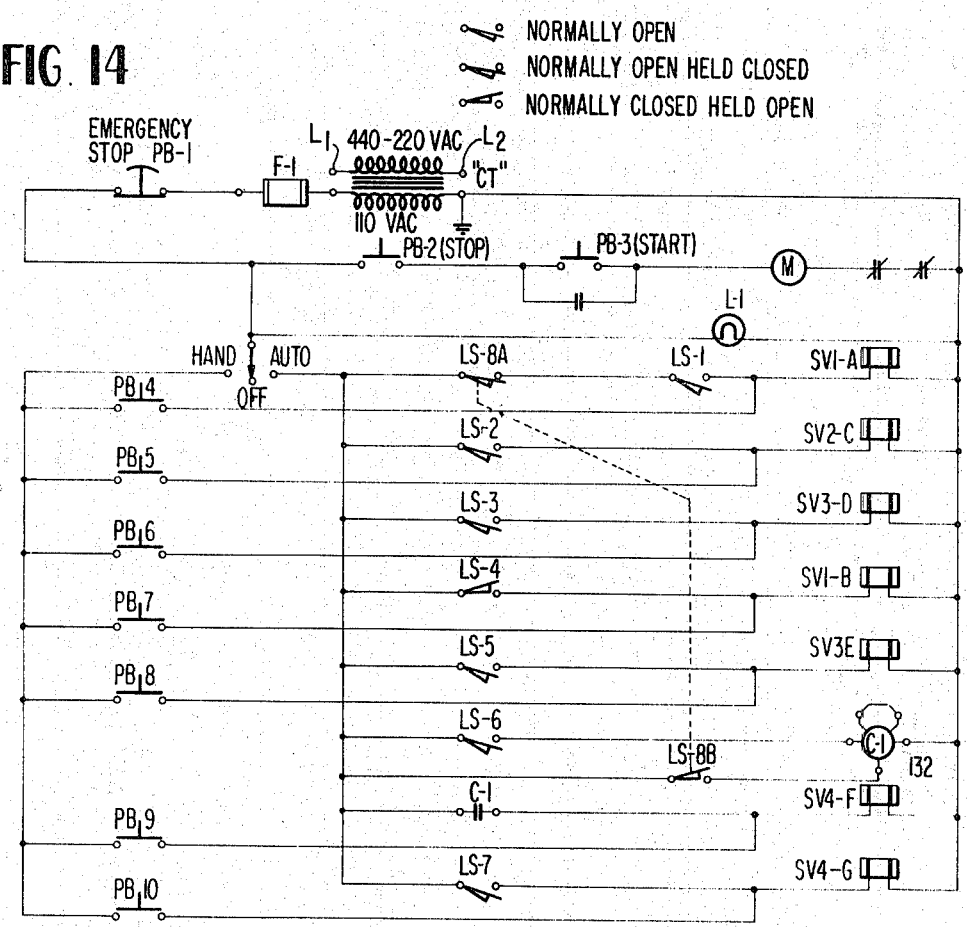
FIG. 14 is an electrical wiring schematic showing the control circuitry employed in the apparatus.
Figure 15:
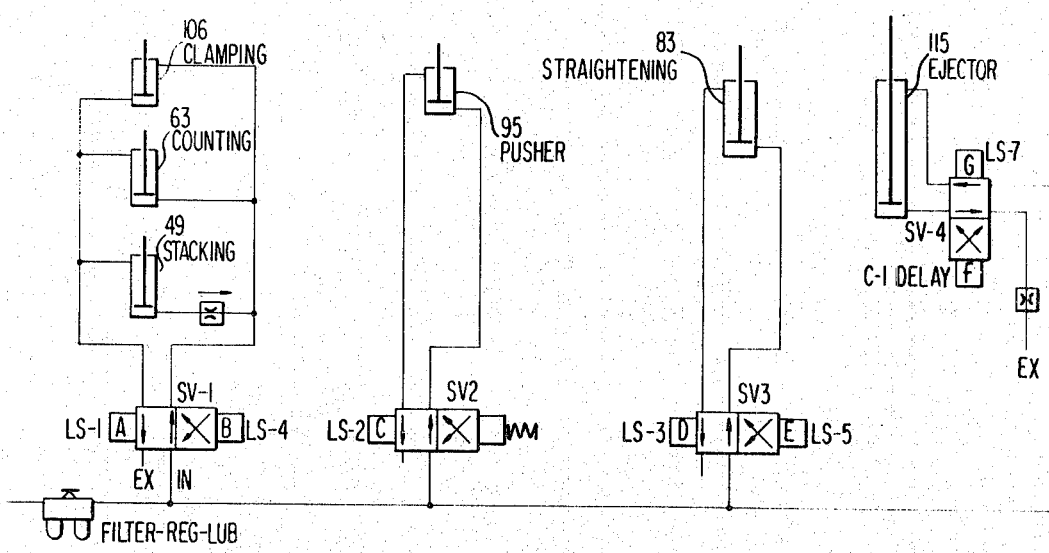
FIG. 15 is a similar schematic of the pneumatic circuit utilized in the apparatus.

These same limit switches shown physically in FIG. 13 are present and correspondingly designated in the wiring schematic of FIG. 14. FIG. 15 also shows the several pneumatic power cylinders of the apparatus schematically, together with the flow conduits leading to and from the cylinders and the several solenoid operated valves which control the passage of fluid to and from these cylinders. These valves also appear in FIG. 14 in conjunction with the limit switches and conventional electrical components and the valves are numbered in the drawings SV-1A and SV-1B, SV-2C, SV-3D and SV-3E, and SV-4F and SV-4G. The associated limit switches are also indicated in FIG. 15 near the solenoid operated valves for clarity. FIGS. 13 through 15, when considered along with the mechanical constructions in the other drawing FIGS., renders an understanding of the overall machine operation readily understandable.

OPERATION

Briefly, the complete operational sequence can be summarized as follows. Assume that power is on and stacking cylinder 49 is extended, counting cylinder 63 extended, clamping cylinder 106 retracted, pusher cylinder 95 extended, straightening cylinder 83 extended, ejection cylinder 115 retracted, belt driving motor is on and cleats 30 are moving toward the stacking station with the belts 28. Assume further that the electrical counter for layers of cleats in a stack designated 132 in FIG. 14 is at 10 layers. The following sequence will take place.

LS-1 is actuated by the backlogging of cleats on rail extensions 56 and this energizes SV-1A causing stacking cylinder 49 to retract, counting cylinder 63 to retract and clamping cylinder 106 to extend its head 108.

LS-2 is actuated by the first cleat in a layer of 20 to reach the downstream side of the hopper 41. This energizes SV-2C causing pusher cylinder 95 to retract with bars 100 so as to firmly pack the layer of 20 cleats in the stacking hopper.

LS-3 is now actuated by retraction of pusher cylinder 95, energizing SV-3D, causing straightening cylinder 83 to retract.

LS-4 is actuated by retraction of the straightening cylinder and this energizes SV-1B causing the stacking cylinder 49 to raise or extend, the clamping cylinder 106 to retract and the counting cylinder 63 to extend.

LS-2 at the rear of the stacking hopper is now deactivated by a layer of cleats moving up and this deenergizes SV-2C causing pusher cylinder 95 to extend.

LS-5 is actuated by full retraction of straightening cylinder 83, FIG. 13, and this energizes SV-3E causing the straightening cylinder to extend.

LS-6 is actuated by stacking cylinder 49 extending, providing an impulse to counter 132. After ten such impulses, counter 132 energizes SV-4F, causing ejecting cylinder 115 to extend with the plate 120.

LS-7 is actuated by extension of the ejector cylinder at the end of its stroke and this energizes SV-4G, causing retraction of the ejection cylinder.

LS-8a is actuated when the ejector cylinder 115 is fully retracted and this prevents the stacking cylinder 49 from falling or retracting when ejector cylinder 115 is extended.

LS-8b is actuated by ejector cylinder 115 extending and this energizes the counter reset coil.

Applying the above sequence of operation to the physical components of the apparatus, it may be observed that the cleats enter the upstream end of the apparatus from a sawing machine, not shown, and pass onto the top runs 28 of the continuously moving belts in a fairly regular procession but with gaps between cleats. These cleats move downstream toward the stacking station S. As they approach the stacking station, the cleats move up onto the rail extensions 56 which are about one-eighth inch above the moving belts and when the cleats are elevated from the belts, they stop and remain at rest until a sufficient number of cleats moving in behind them build up sufficient pressure to push the first few cleats toward the stacking station. Generally, 30 or more cleats backlogging behind the extensions 56 will develop the required pressure.

Eventually, the leading cleat on the rail extensions 56 will engage and shift the rod 111, FIG. 16, toward LS-1, actuating the same, and at this point, the backlogged cleats at least in excess of 21 are in a solid layer, as shown in FIG. 4. These cleats are in the counting area where the plungers 72 are located. When LS-1 is actuated, the counting plungers 72 fall and clamp the 21st cleat behind LS-1 against the clamping bars 74, FIG. 4. The crosshead 53 of stacking cylinder 49 which has been up, now falls to the position shown in FIGS. 1 and 8. The clamping cylinder 106 now thrusts its clamping head 108, FIG. 9, into the hopper 41 to grip and hold the adjacent layer of cleats shown in broken lines in FIG. 9.

The counting plungers 72 hold the 21st cleat stationary, FIG. 4, until clamping cylinder 106 retracts. The stacking cylinder 49 then falls or retracts and the extension rails 56 and associated switch LS-1 will also fall. This places the layer of 20 cleats back on the moving belts 28 and they start their downstream movement into the stacking hopper 41. When the clamping head 108 enters the hopper 41, it contacts a layer of 20 cleats which had been resting on the elevating plates 55, FIG. 8, before the crosshead 53 moved downwardly. The clamping head 108 prevents this layer of 20 cleats from falling as the plates 55 move from under them.

At this instant in the operation, the 21st cleat is still being held back by counting plungers 72. Cleats are continuing to move downstream from the saw and are backlogging behind the plungers 72, FIG. 4. A layer of 20 cleats is moving into the stacking hopper and above them another layer of 20 cleats are suspended by the clamping head 108.

When the first cleat of the layer entering the hopper 41 reaches the back wall 42 and operates LS-2, the following takes place. The cleat pusher bars 100, FIG. 6, are retracted downstream, as described, to assure firm packing of the adjacent layer of 20 cleats in the stacking hopper regardless of misalignment, splintering, warping of cleats and like irregularities. Simultaneously, the counting plungers 72 rise and release the 21st cleat, now to become the leading cleat of the next layer of 20. The clamping head 108 releases and the layer of cleats held thereby simply drop about one-quarter inch onto the tops of latches 57. The straightening arms 86 begin to move up and rearwardly toward their full line positions of FIG. 3 and the stacking crosshead 53 and associated parts including the rail extensions 56 again move upwardly. As the crosshead 53 rises, the layer of 20 cleats now in the bottom of stacking hopper 41 on the belts 28 is lifted by the plates 55 and this layer engages the tapered latches 57 and the latter yield outwardly and allow the cleats to pass above the latches and the latter return automatically to their supporting positions shown in FIG. 8. At this time, the crosshead 53 will be at its maximum elevation. The next uppermost layer of cleats in the accumulating stack will be pushed up in the hopper 41 due to the action of the stacking cylinder 49. The cleats are also again accumulating on the rail extensions 56, as previously described. The straightening or aligning arms 86 have made contact with the oncoming cleats and have pushed them back upstream approximately 2 inches and in so doing, the oncoming cleats are straightened up so as to be at right angles to the belts transversely. The arms 86 then return to their lowered positions shown in broken lines in FIG. 3.

At this time in the operating cycle, cleats are moving with the belts downstream into the counting zone, FIG. 3, and have already been straightened by the arms 86. The stacking crosshead 53 has moved up and in so doing has brought LS-1 and actuator rod 111 into the path of the oncoming layer of cleats and the rail extensions 56 are up, FIG. 4. The pusher bars 100 have returned to their upstream and down positions shown in broken lines in FIG. 6 and the clamping head 108 is retracted from the hopper 41 and is waiting to clamp the next layer of 20 cleats that are now resting on the elevating plates 55 when it receives its signal to do so. The cleats moving into the counting zone ride up onto the rail extensions 56 as previously described and when 30 or more cleats have backlogged in this area, the leading cleat will engage rod 111 and activate LS-1 and at this point the cycle of operation has been completed and is about to repeat. That is to say, the cycle of operation of stacking one 20-cleat layer has been completed and is about to be repeated.

The next step in the complete apparatus operation is to eject a 10-layer high stack of 200 cleats from the stacking hopper 41 into the receiver, FIG. 10, where the stack is tied by the mechanism 130. As previously described, this ejection is accomplished by the means shown in FIG. 11. The ejection cylinder 115 receives its signal to extend from the electrical counter 132 and this counter receives an electrical impulse from LS-6 each time the stacking crosshead 53 rises. After the counter has received ten such impulses, it operates the ejection cylinder 115 to deliver a 10-layer stack of cleats to the stack receiver having walls 123, 124 and 125. As the ejection plate 120 is fully extended, it operates LS-7 which provides a signal for the cylinder 115 to retract to its position of FIG. 11.

It is believed that the many advantages and features of the invention should now be clear to those skilled in the art without the necessity for further description herein. The machine is very reliable and stacks the cleats rapidly and with economy which is the prime objective of the invention.

We claim:

1. A machine for stacking cleats comprising a bed, continuously moving conveyor belt means traveling on the bed and adapted to convey a multitude of cleats toward a stacking station, a stacking hopper for plural layers of cleats at the stacking station, means beneath said hopper to elevate cleats one layer at a time into the bottom of the hopper and to thereby elevate the stack, coacting resilient latch means in the hopper to support the stack of cleats therein when the means to elevate is lowered, extension rail means carried by said means to elevate and extending upstream from said hopper and projecting slightly above the moving belt means when the means to elevate is in a raised position, whereby cleats traveling with the belt means are pushed onto the extension rail means and thereby lifted slightly from the belt means while the belt means continue to move downstream, whereby a substantially solid single layer of cleats is backlogged on the extension rail means, a coacting cleat clamping means somewhat upstream from the extension rail means for clamping one cleat against a fixed abutment and arresting downstream movement of such cleat without arresting movement of the belt means, said clamping means also functioning to count a predetermined number of cleats in said one layer accumulating on said extension rail means, and cycle control means for said means to elevate, and said clamping means.

2. The structure of Claim 1, and intermittently operated means to engage the trailing cleat of each cleat layer upon entry into the stacking hopper for packing the cleats of such layer into firm contact prior to elevating the layer of cleats.

3. The structure of Claim 2, and said intermittently operated means is a pair of generally horizontal reciprocating cleat pusher bars extending somewhat upstream from said hopper and close to the belt means and substantially parallel thereto and having pusher heads adapted to rise above the belt means for engagement with the trailing cleat in each layer of cleats, and cam means acting on said bars during their longitudinal reciprocation to effect the raising and lowering of said heads.

4. The structure of Claim 1, and power operated means near said cleat clamping means including a pair of vertically swingable arms which move in opposition to the cleats on said belt means and engage cleats near their opposite ends and push them back upstream with respect to the moving belt means and thereby aligning the cleats substantially transversely of the belt means.

5. The structure of Claim 4, and cam means on said machine adjacent to said vertically swingable arms and engaging the latter during their upstream and downstream movement to thereby raise the swingable arms and lower the same with respect to the elevation of the belt means and the cleats thereon.

6. The structure of Claim 1, and means to eject laterally cleat stacks from said stacking hopper consisting of a predetermined number of cleat layers.

7. The structure of Claim 6, wherein said means to eject comprises an extensible and retractable pusher means, and an electrical counter means responsive to each operation of said means to elevate the cleats, said counter means upon receiving a predetermined number of impulses activating the pusher means.

8. The structure of Claim 7, and a receiver for each ejected stack of cleats near one side of said stacking hopper, and mechanism adjacent said receiver for binding each stack of cleats with a wire element.

9. The structure of Claim 8, and a spring-loaded sidewall on said receiver urging each ejector cleat stack toward the opposing wall of the receiver to square off the stack of cleats prior to binding them.

10. The structure of Claim 1, and a pair of overhead suspended longitudinal staybars adjacent to and above the extension rail means and spaced slightly above the cleats upon the extension rail means and preventing the cleats from buckling upwardly due to rearward pressure from backlogging cleats moving with the belt means.

11. The structure of Claim 1, wherein said bed comprises a pair of laterally spaced parallel substantially horizontal bars extending upstream from said stacking hopper and said conveyor belt means being a pair of parallel endless conveyor belts having upper runs engaging and sliding upon said bars.

12. The structure of Claim 11, and a pair of parallel longitudinal guide rails immediately outwardly of said belts and extending for a major portion of the length of the machine and projecting above the upper runs of the belts to arrest lateral displacement of the cleats endwise while on said belts.

13. The structure of Claim 1, wherein said clamping means comprises a pair of cleat clamping elements above the belt means, power means to raise and lower said elements relative to the belt means and the cleats moving therewith, stationary clamping bars on the machine directly beneath said elements and clear of the belt means and being normally slightly below the elevation of the belt means and the bottoms of the cleats thereon, and said bed upon which the belt means travels being recessed adjacent the clamping means so that when said elements are lowered to clamp a cleat against said clamping bars fixedly said belt means is displaced downwardly within the recesses of said bed and continues to slide beneath the clamped cleat.

14. The structure of Claim 1, wherein said latch means comprises a pair of opposing latch bars extending longitudinally of the belt means within the lower portion of said stacking hopper, pivoted arms carrying the latch bars, springs connected with said arms and urging them toward each other and toward the ends of cleats on the belt means, the ends of the cleats being beveled and the latch bars having lower beveled faces to coact with the beveled ends of the cleats as the latter are elevated.

15. An apparatus for stacking cleats comprising a substantially level supporting bed, cleat conveyor belts engaging said bed and supported thereon and adapted to carry a procession of cleats longitudinally of the apparatus with the cleats transversely of the belts, power means to drive the belts continuously at a predetermined speed, a cleat stacking hopper near the downstream end of the apparatus adapted to receive cleats into its lower end one layer at a time, means beneath said hopper to elevate the cleats one layer at a time within the hopper when such layers are resting upon the belts, latch means within the hopper operated by each elevated layer of cleats and serving to support a stack of such layers in the hopper, means associated with the hopper to eject laterally therefrom a stack of cleats having a predetermined number of layers therein without disturbing additional layers therebelow, power means on the apparatus extending somewhat upstream from the hopper and engageable with the trailing cleat in each layer to push such layer firmly and completely into the hopper prior to elevating the layer, slightly elevated rail means upstream from the hopper and second-named power means to marshal layers of cleats each with a predetermined number of cleats by allowing backlogging cleats on said belts to push forward cleats onto the elevated rail means and thereby slightly lift them from the moving belts, a cleat clamping means upstream from the rail means to arrest downstream movement of the cleats without stopping the belts and allowing said layer of cleats formed on the rail means to advance into the hopper when the rail means is lowered, the rail means secured to and moving with said means to elevate the cleats, said clamping means also constituting a counter of cleats to enable each layer formed on the rail means to contain an exact number of cleats, and electrical control means for the apparatus causing the first and second named power means, cleat elevating means and cleat clamping means to operate in timed relationship.

16. The structure of Claim 15, and an additional power means in the vicinity of the clamping means and being movable in the upstream direction at predetermined times against the cleats to straighten the same on said belts.